(12) United States Patent
Sprenger

(10) Patent No.: US 7,684,058 B2
(45) Date of Patent: Mar. 23, 2010

(54) ELECTROOPTICAL DISTANCE MEASURING DEVICE

(75) Inventor: Franz Sprenger, Widnau (CH)

(73) Assignee: Leica Geosystems AG, Heerbrugg (CH)

( * ) Notice: Subject to any disclaimer, the term of this patent is extended or adjusted under 35 U.S.C. 154(b) by 24 days.

(21) Appl. No.: 11/997,461

(22) PCT Filed: Jul. 3, 2006

(86) PCT No.: PCT/EP2006/006474

§ 371 (c)(1),
(2), (4) Date: Mar. 18, 2008

(87) PCT Pub. No.: WO2007/017020

PCT Pub. Date: Feb. 15, 2007

(65) Prior Publication Data

US 2008/0218760 A1  Sep. 11, 2008

(30) Foreign Application Priority Data

Aug. 8, 2005  (EP) .................... 05107273

(51) Int. Cl.
*G01B 11/14* (2006.01)
(52) U.S. Cl. ..................................... 356/614
(58) Field of Classification Search .......... 356/601, 356/614, 3.03, 3.1, 4.01, 5.06, 3
See application file for complete search history.

(56) References Cited

U.S. PATENT DOCUMENTS

| | | | |
|---|---|---|---|
| 4,521,107 A * | 6/1985 | Chaborski et al. | 356/5.06 |
| 5,812,893 A | 9/1998 | Hikita et al. | |
| 6,501,538 B1 | 12/2002 | Keinath et al. | |
| 6,781,675 B2 * | 8/2004 | Gogolla et al. | 356/4.01 |
| 2004/0223164 A1 * | 11/2004 | Gogolla et al. | 356/601 |

FOREIGN PATENT DOCUMENTS

| | | |
|---|---|---|
| DE | 102 44 638 | 4/2004 |
| EP | 0 701 702 | 3/1996 |
| EP | 1 351 070 | 10/2003 |
| GB | 2 991 107 | 1/2004 |

\* cited by examiner

*Primary Examiner*—Tarifur R. Chowdhury
*Assistant Examiner*—Isiaka O Akanbi
(74) *Attorney, Agent, or Firm*—Workman Nydegger

(57) ABSTRACT

The invention relates to an electrooptical distance measuring device comprising a transmitter that emits optical radiation for lighting an object to be measured, an optical transmitting system which is rigidly mounted in relation to the transmitter and a light collector. A support element is positioned with a measurement receiver and a receiving electronics in relation to the light collector. The support element is rigidly linked with the measurement receiver with regard to at least two directions of movement.

17 Claims, 3 Drawing Sheets

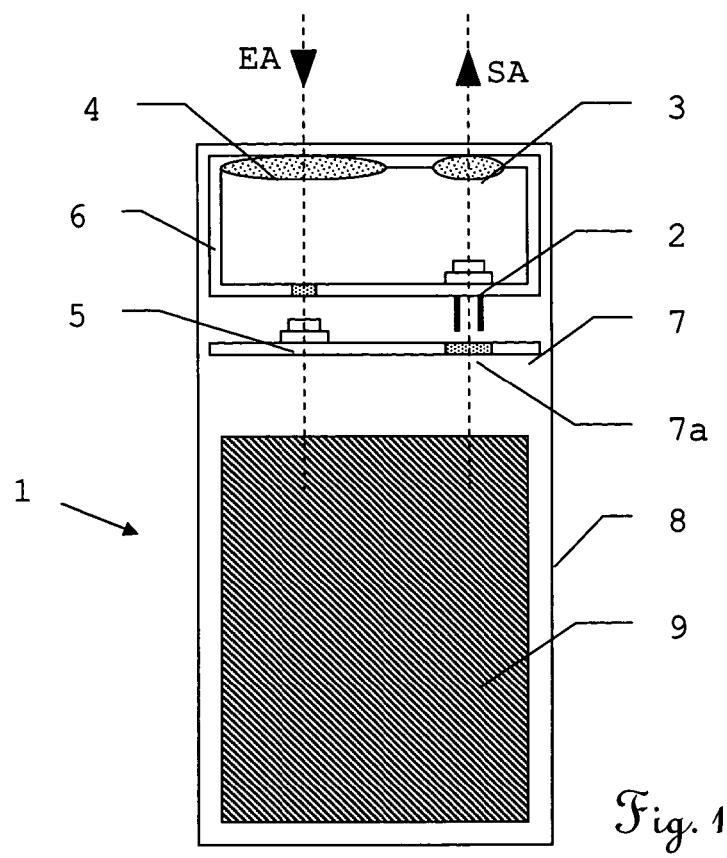
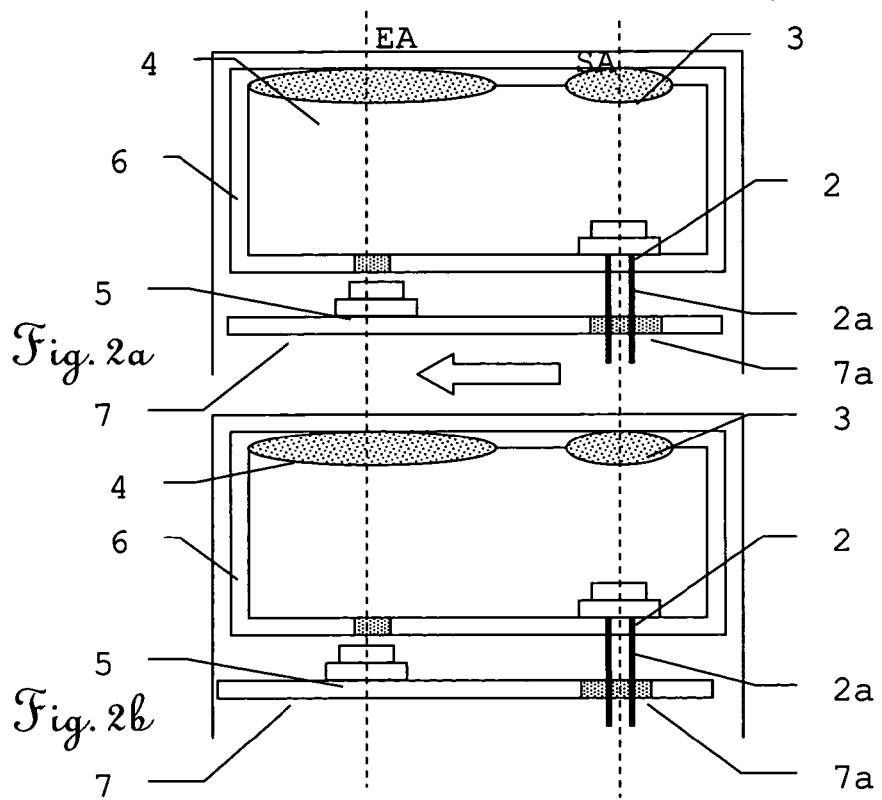
Fig. 1
Fig. 2a
Fig. 2b

ELECTROOPTICAL DISTANCE MEASURING DEVICE

The invention relates to an electrooptical distance measuring device and a method for adjusting such a distance measuring device.

BACKGROUND OF THE INVENTION

Distance measuring devices in the form of hand-held measuring devices or industrial sensors have long been known and are commercially available. Their distance measuring range is up to 200 m and they are used, for example, in construction surveying, for example for the 3-dimensional surveying of rooms. For this purpose, a transmitter emits intensity-modulated radiation, in general wavelengths in the visible range being used, which facilitates the sighting of the measuring points. The radiation is reflected or scattered by the measured object and picked up by the receiver. The distance to the measured object is obtained on the basis of the phase position of the modulated radiation relative to the transmitter.

Such a measuring device is disclosed, for example, in EP 0 701 702. In this device, a semiconductor laser emits light to an object to be surveyed, this light being received again and evaluated after reflection. The measuring receiver has an optical system whose beam axis is oriented substantially parallel to the transmission axis, deflection elements for beam guidance or movable, trackable entry surface for the measuring radiation being used in the close vicinity.

In order to realise a highly precise measurement with a low level of extraneous light components, the received radiation must be limited to the measuring radiation component. This can be achieved by a suitable choice of the diameter of the detector surface of the receiver relative to the focal distance of the optical system. An advantageous lower ratio of diameter to focal distance in this context makes the arrangement sensitive with regard to the exact orientation and requires adjustment of the components, for example during manufacture, as can be realised by moveable adjusting elements or corresponding adjusting facilities.

An adjustable arrangement of transmitter and receiver is disclosed in EP 1 351 070, in which an electrooptical distance measuring system for large measuring ranges comprising the optical transmission axis and receiving axis arranged in parallel a distance apart is described. The radiation source and a small-area photodiode are mechanically connected rigidly to one another via an essentially rigidly connected circuit board assembly. The small-area photodiode is electrically conductive and is fixed in position by means of its electrical contacts on the circuit board assembly so as to be temporarily adjustable. The adjustment is therefore effected by a movement of the photodiode relative to the circuit board assembly, the photodiode being fixed after reaching the optimum position. By means of this fixing step to be carried out in the device, in which an individual electronic component must be moved, manufacture is made more complicated. In particular, the photodiode cannot already be mechanically fixed rigidly on the circuit board. This prevents utilisation of the advantages of surface-mounted devices which are soldered fully automatically by standard machines directly onto the conductor tracks, for example from points of view of assembly and strength.

SUMMARY OF THE INVENTION

It is the object of the invention to provide an electrooptical distance measuring device having an improved design, increased stability and simplified assembly.

The invention predominantly relates to hand-held distance measuring devices of the generic type according to the phase or pulse transit time measuring principle and based on an adjustability of receiver components by displacement of the support element supporting these components. The measuring receiver is fixed on a support element at least relative to two directions of movement and hence translationally fixed. Adjustments in these directions of movements are effected by displacement of the complete circuit board relative to the beam axis of the receiving optical system, the circuit board also being capable of holding components of the evaluation electronic system. Suitable support elements are, for example, the circuit board or board which, in the form of printed circuit or printed circuit board, can have conductor tracks for the components and can be automatically assembled.

The fixing of the measuring receiver on the circuit board can advantageously be effected as a so-called surface mounted device. Here, the components have no wire connections but are soldered directly onto the circuit board by means of solderable connection surfaces. This results in a mechanically strong connection which is robust with regard to environmental influences.

If the receiving optical system is realised with a fixed focus, the measuring receiver can be fixed in all three directions and hence rigidly on the support element. Positioning need therefore be effected only in the two directions of movement perpendicular to the optical axis. After adjustment is completed, the circuit board or the support element can then be fixed, for example by tightening of screws, adhesive bonding or other fixing methods.

An alternative to a fixed focus is focussing by means of a mirror or another deflection element which lengthens or shortens the beam path to the measuring receiver. The mirror can be moved relative to the measuring receiver so that the third degree of freedom for focussing is achieved by this variable distance. The focussing in this variant is thus independent of the adjustment in the other two directions of movement and can be carried out very simply in one axis before the adjustment. The adjusted image can be clearly seen only during or after the adjustment.

Limited direct adjustability relative to the support element can be achieved by adjustability of the measuring receiver in one direction of movement. Thus, an optical system without a fixed focus can be used and the focussing is effected by the movement with regard to the remaining translational degree of freedom. One possibility for such a movement can be realised by mounting the measuring receiver on a free strip of the printed circuit board. The printed part of the circuit board on which the measuring receiver is arranged is springy and can be pressed, for example, by a screw or another adjusting element into the focus.

The advantages of these working examples are in particular the possibility of fixing avalanche photodiodes as a surface mounted device. These diodes can therefore be automatically inserted in the same operation with the remainder of the electronics.

An advantageous development basically independent of the specific fixing of the laser diode also provides for the integration of a driver chip into the standard design of a laser diode, for example by replacing the photodiode chip by the driver chip. Here, the same housing can still be used, the contacts being assigned as follows:
1) Ground
2) VCC voltage supply
3) Signal input The transfer of the driver chip into the laser diode housing results in various advantages:

Firstly, short pulses with high power can be produced, which pulses permit a better measuring performance. In order to produce such pulses having a pulse width of a few 100 ps, currents which are as high as possible must be passed through the laser in a very short time. The inductance of the circuit comprising driver and laser is a limiting factor. Here, the required voltage is proportional to the inductance at a specified current increase.

$$U = L \cdot \frac{dI}{dt}$$

The voltage is limited by the semiconductor technology used, i.e. the faster the technology, the smaller are the possible voltages which can be used. By combining driver chip and laser chip in a standard housing, the inductance in the power circuit can be optimised in this manner.

Secondly, in the case of short pulses, the deflection of extraneous radiation is always a problem so that metallic screening chambers have to be constructed. The use of the laser housing results in good screening of the load circuit, so that the remaining assembly of optical system and printed circuit is possible on plastic modules.

The translational positioning of the measuring receiver relative to the optical axis of the receiving optical system is very easy to realise since the printed circuit board is simply gripped on the outside or edge and displaced. The board is thus very easily accessible for an adjustment device.

Owing to the high frequencies used, screening of the electronics is generally necessary. Since, for stability reasons, a module comprising metal is used for holding the optical system, a screened chamber can be formed together with the conductor tracks.

In general, an additional optical element is required for optimum measurement over short distances, e.g. from 5 cm. The solution according to the invention makes it possible to mount this element on the photodiode after assembly. Thereafter, the board is fixed on the optics module or optics support and adjusted.

BRIEF DESCRIPTION OF THE DRAWINGS

Below, working examples of the invention are explained purely schematically in more detail with reference to the drawing.

FIG. 1 shows a first working example of a distance measuring device according to the invention;

FIG. 2*a-b* shows schematic detailed views of the first working example;

DETAILED DESCRIPTION OF THE DRAWINGS

Figure 3A:
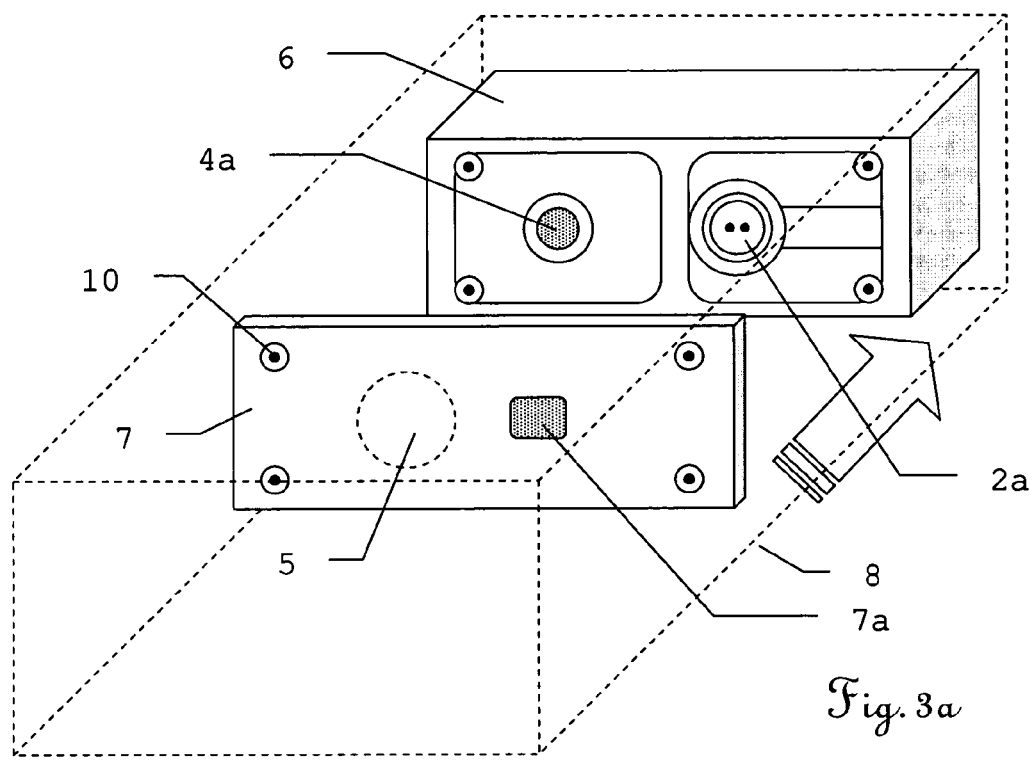
FIG. 3*a-b* show figurative detailed views of the first working example

FIG. 1 shows a first working example of an electrooptical distance measuring device 1 according to the invention, comprising a laser diode 2 as a transmitter, which emits optical radiation or laser light via a transmission optical system 3 having a transmission axis SA for illuminating a measured object. The light reflected by the measured object is received by a receiving optical system 4 having a receiving axis EA and passed to a measuring receiver 5, e.g. an avalanche photodiode. The transmission axis SA and the receiving axis EA are oriented parallel or with only a slight inclination relative to one another, so that the arrangement within the measuring range has a character of beam paths offset parallel relative to one another. The transmission optical system 3 and the receiving optical system 4 can advantageously be arranged on a common optics support 6 which can also hold the laser diode 2 and fix it rigidly relative to the transmission optical system 3. In this working example, the emission axis of the laser diode 2 is coaxial with the transmission axis of the transmission optical system 3.

A first support element having transmission electronics is assigned to the laser diode 2, and a second support element having receiving electronics is assigned to the measuring receiver 5, the two support elements being in the form of a single circuit board 7 as a common support element in this working example. The measuring receiver 5 is rigidly connected to the second support element or the circuit board 7 with respect to at least two directions of movement, completely rigid fastening with fixing of all degrees of freedom relative to the circuit board 7 being effected in this working example.

In the formation as a surface mounted device, the fastening is effected directly and with final fixing on the conductor track. In this working example, an opening 7*a* or a passage through which the contact elements 2*a* of the laser diode 2 are led is additionally formed in the circuit board 7. While the laser diode 2 is fixed on the optics support 6 and is therefore positioned in a defined manner relative to the transmission optical system 3, the measuring receiver 5 can be displaced by a movement of the circuit board 7 relative to the receiving axis 3*a* and adjusted thereby. In this working example, the receiving optical system 4 is formed with a fixed focus so that it is possible to dispense with focussing adjustment of the measuring receiver 5. The optics support 6 with its components and the circuit board 7 are arranged, together with further components 9, such as, for example, the power supply, in a housing 8 of the distance measuring device 1. After adjustment is complete, the axis of the measuring receiver 5 and the receiving axis of the receiving optical system 4 are aligned substantially coaxially.

The adjustment according to the invention for the first working example is explained in FIG. 2*a-b* in schematic detailed views.

FIG. 2*a* shows a situation in which the receiving axis EA and the optical axis or the midpoint of the measuring receiver 5 are not in coincidence. By displacing the circuit board relative to the optics support 6, the situation shown in FIG. 2*b* with the alignment of the measuring receiver 5 with the receiving axis EA can be achieved. After positioning is complete, the circuit board 7 can be fixed on the optics support 6. The laser diode 2 is decoupled from the displacement of the circuit board 7 by the opening 7*a* in the circuit board. After adjustment is complete, the contact elements 2a of the laser diode 2 are connected to the circuit board 7 and the transmission electronics arranged thereon. In this example, the fixing of the common circuit board 7 is effected relative to the optics support 6. According to the invention, however, it is also possible to use two separate circuit boards for laser diode 2 and measuring receiver 5. Direct fixing of the circuit board 7 to the receiving optical system 4 or indirect fastening via the housing 8 is also possible. If a possibility of movement of the circuit board 7 in the direction of the receiving axis EA is also realised, the fixed focus can be dispensed with and focussing of the measuring receiver 5 can be achieved.

Figure 3B:
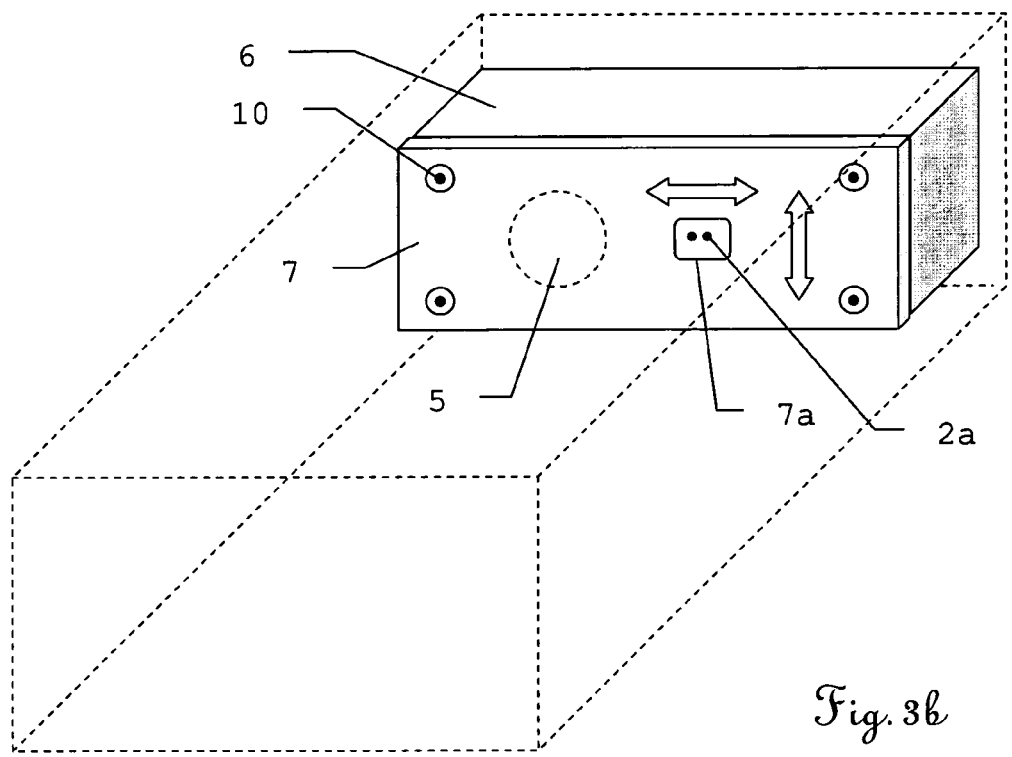

FIG. 3a-b illustrate the design of the first working example by means of figurative detailed views. For presentational reasons, only the circuit board 7 and the optics support 6 are shown in the housing 8. A receiving opening 4a of the receiving optical system 4 and the back of the laser diode with the contact elements 2a can be seen on the back of the optic support 6, which is visible in FIG. 3a. Bores 10 for connection of these components by means of screws are made in the circuit board 7 and the optics support 6, this connection being designed so that displaceability of the circuit board 7 relative to the optics support 6 still exists prior to tightening of the screw connection. The circuit board 7 is basically adjusted to such an extent that the contact elements 2a are flush with the opening 7a and the measuring receiver 5—arranged here on the opposite side of the circuit board 7—is flush with the receiving opening 4a.

FIG. 3b shows the distance measuring device during the adjusting process. Circuit board 7 and optics support 6 are connected to one another, the contact elements 2a being led, with a play sufficient for the adjustment, through the opening 7a of the circuit board 7. The measuring receiver 5 is adjusted with respect to the receiving axis by lateral displacement of the circuit board 7 relative to the optics support 6.

Figure 4:
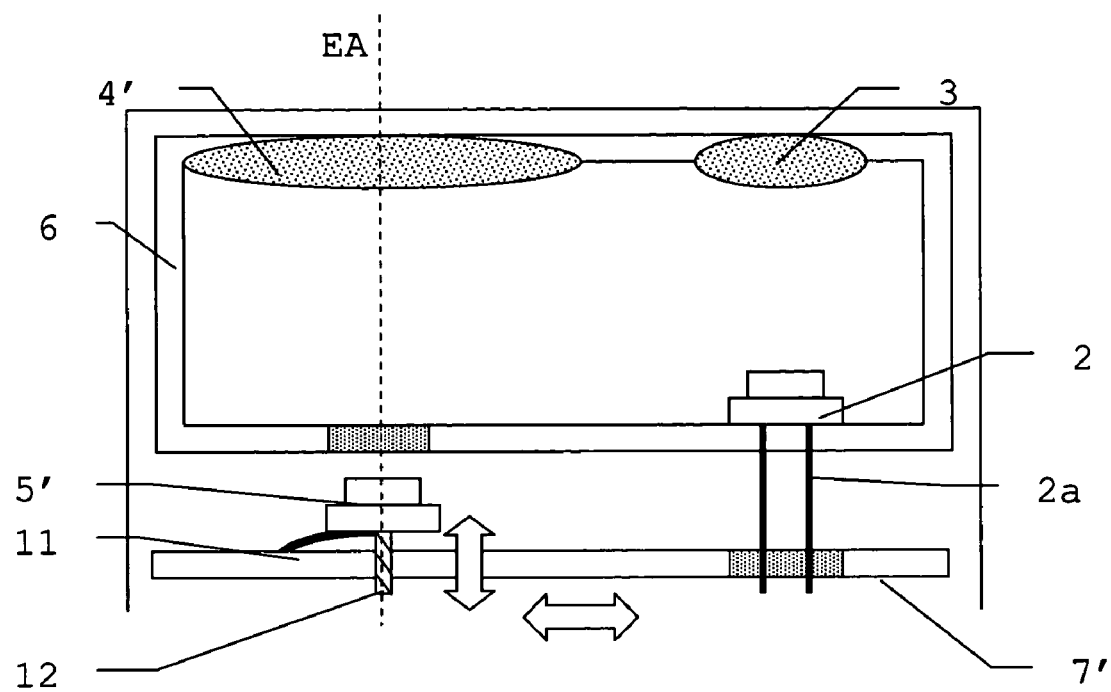
FIG. 4 shows a schematic detailed view of a second working example of the distance measuring device according to the invention and FIG. 5 shows a schematic detailed view of a third working example of the distance measuring device according to the invention.
Figure 5:
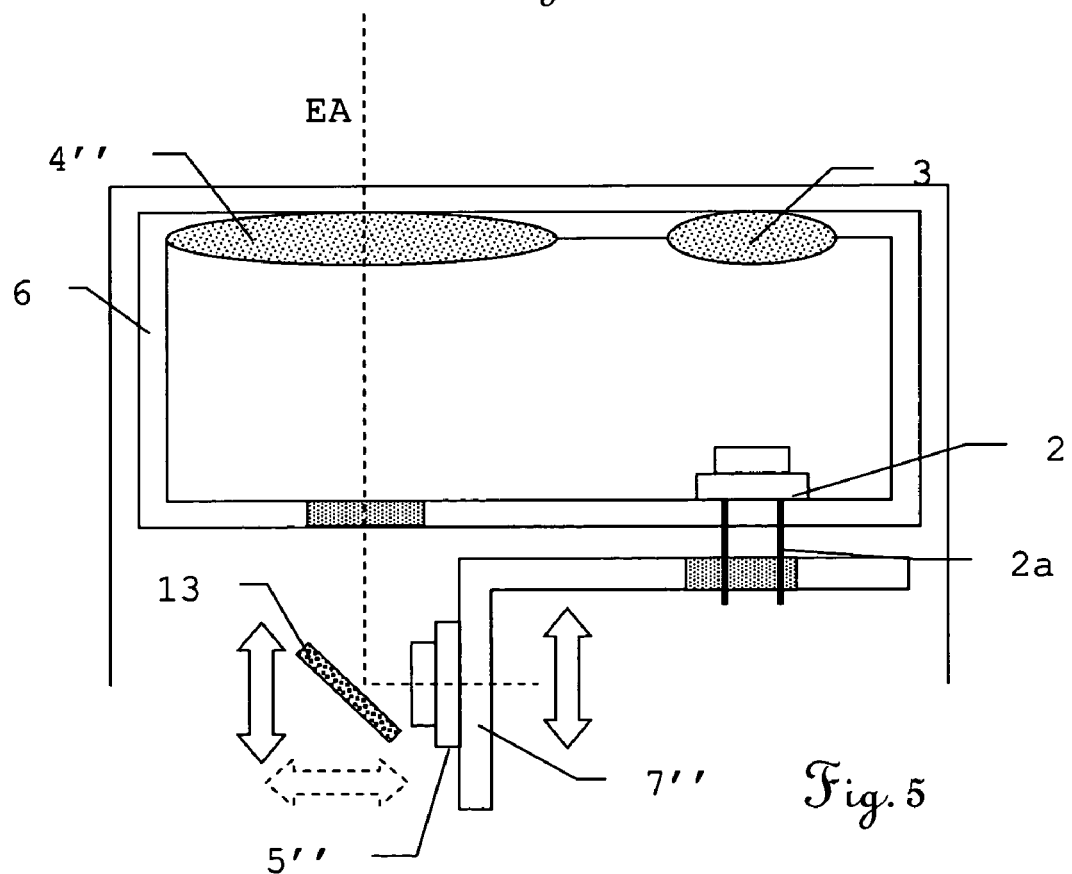

FIG. 4 and FIG. 5 show two alternative working examples of a distance measuring device according to the invention.

FIG. 4 shows a schematic detailed view of a second working example having a measuring receiver 5' moveable perpendicular to the circuit board 7'. In this working example, the receiving optical system 4' is not formed with a fixed focus so that positioning of the measuring receiver 5' with focussing is required. The measuring receiver 5' is fixed in two directions of movement relative to the circuit board 7'. In the third direction of movement, however, it can be moved, spring-mounting on a resilient element 11, e.g. a free conductor track, being effected. The measuring receiver 5' is rigidly arranged on the conductor track itself with regard to all directions of movement and is finally fixed during the assembly itself. The adjustability in one dimension or the focusability is a result of the springy mobility of the conductor track relative to the circuit board. The precise displacement and fixing are permitted by way of example by a grub screw 12. By means of this development, the measuring receiver 5' can be positioned perpendicular to the receiving axis EA by displacement of the circuit board 7', the focussing being effected by adjustment of the grub screw 12.

FIG. 5 shows a third working example having a deflection mirror 13 suitable only for focussing or another optical deflection element for a receiving optical system 4" without a fixed focus. Once again, the measuring receiver 5" is fixed on the circuit board 7", which is now angled, in this working example all degrees of freedom of the measuring receiver 5" relative to the circuit board being reduced and a fixed connection existing. Because the movement of deflection mirror 13 and circuit board 7" can be decoupled and are thus independent of one another, both positioning perpendicular to the receiving axis EA and focussing can be achieved. Depending on the specific design features, such as, for example, size of the receiving surface of the measuring receiver 5", the relative movement of mirror 13 and measuring receiver 5" can be permitted in different directions, which is illustrated in FIG. 5 by a dashed arrow.

The working examples shown in the figure are not to be understood as being definitive. In particular, individual features can be combined with one another. Thus, divided circuit boards or those which have different angles or uneven progressions, which adapt, for example, to corresponding developments of the housing, can also be used. The fixing of the circuit board or of another support element by means of differently formed clamping, soldering or adhesive bonding techniques can also be effected.

The invention claimed is:

1. An electrooptical distance measuring device comprising:
   a transmitter which emits optical radiation for illuminating a measured object;
   a transmission optical system rigidly fixed relative to the transmitter;
   a first support element having transmission electronics;
   a measuring receiver which detects radiation reflected by the measured object;
   a receiving optical system; and
   a second support element having receiving electronics, wherein the second support element is equipped with the measuring receiver rigidly connected with respect to at least two directions of movement and is movable relative to the receiving optical system, wherein a mirror element is linearly moveable relative to the measuring receiver.

2. A distance measuring device according to claim 1, wherein the measuring receiver is inserted on a conductor track of the second support element and fixed relative to the conductor track with respect to all directions of movement.

3. A distance measuring device according to claim 1, wherein the second support element is substantially sheet-like and the measuring receiver is fixed with respect to at least the directions of movement in the surface.

4. A distance measuring device according to claim 1, wherein the measuring receiver can be moved perpendicularly to the second support element by a springy component of the second support element.

5. A distance measuring device according to claim 1, wherein the measuring receiver is fixed on the second support element in all three directions of movement as an assembly surface-mounted directly on the support element, and the receiving optical system has a fixed focus.

6. A distance measuring device according to claim 1, wherein the transmission optical system, transmitter and/or receiving optical system are rigidly fixed on the optics support.

7. A distance measuring device according to claim 1, wherein the transmitter is in the form of a laser diode having driver electronics integrated in a housing of the laser diode.

8. A distance measuring device according to claim 1, wherein the mirror element is moveable in the direction of the optical axis of the receiving objective with the measuring receiver.

9. A distance measuring device according to claim 1, wherein first and second support elements form a common support element in the form of a circuit board.

10. A distance measuring device according to claim 9, wherein the common support element is movable relative to the receiving optical system and/or the optics support.

11. A distance measuring device according to claim 10, wherein the common support element includes a circuit board and the common support element is displaceable in a plane perpendicular to the optical axis of the receiving optical system.

12. A distance measuring device according to claim 9, wherein the common support element has an electrical connection to the transmitter which is capable of being fixed.

13. A distance measuring device according to claim 1, wherein an emission axis of the transmitter is coaxial with a transmission axis of the transmission optical system.

14. A distance measuring device according to claim 1, wherein the transmitter includes a laser diode and the measuring receiver includes an avalanche photodiode.

15. A distance measuring device according to claim 1, wherein the mirror element is linearly moveable in at least two perpendicular planes relative to the measuring receiver.

16. A distance measuring device according to claim 1, wherein the at least two perpendicular planes relative to the measuring receiver include a vertical plane and a horizontal plane.

17. A method for adjusting an electrooptical distance measuring device including a transmitter which emits optical radiation for illuminating a measured object, a transmission optical system rigidly fixed relative to the transmitter, a first support element having transmission electronics, a measuring receiver which detects radiation reflected by the measured object, a receiving optical system, a second support element having receiving electronics, and comprising:

positioning the measuring receiver relative to the receiving optical system, wherein the second support element is equipped with the measuring receiver rigidly connected with respect to at least two directions of movement and is moved relative to the receiving optical system during positioning, wherein a mirror element is linearly moveable relative to the measuring receiver.

* * * * *